United States Patent

[11] 3,630,099

| [72] | Inventor | Takeomi Miyoshi<br>Tokyo, Japan |
|---|---|---|
| [21] | Appl. No. | 29,019 |
| [22] | Filed | Apr. 16, 1970 |
| [45] | Patented | Dec. 28, 1971 |
| [73] | Assignee | Honda Giken Kogyo Kabushiki Kaisha<br>Tokyo, Japan |
| [32] | Priority | Apr. 19, 1969 |
| [33] | | Japan |
| [31] | | 44/35507 |

[54] RACK AND PINION STEERING GEAR APPARATUS FOR A VEHICLE
6 Claims, 2 Drawing Figs.

[52] U.S. Cl. .................................................. 74/498, 74/422
[51] Int. Cl. ........................................ B62d 1/20, F16h 1/04
[50] Field of Search ........................................ 74/422, 498

[56] References Cited
UNITED STATES PATENTS

| 2,867,284 | 1/1959 | Hruska .......................... | 74/498 X |
| 2,620,698 | 12/1952 | Warner .......................... | 74/422 X |
| 2,945,395 | 7/1960 | Ziskal ............................ | 74/422 X |

FOREIGN PATENTS

| 813,245 | 5/1959 | Great Britain ................ | 74/422 |
| 776,052 | 6/1957 | Great Britain ................ | 74/422 |

*Primary Examiner*—Arthur T. McKeon
*Attorney*—Waters, Roditi, Schwartz & Nissen ABSTRACT: A vehicle steering gear apparatus comprises a pinion shaft in mesh with a rack, the pinion shaft being connectable to a steering wheel and the rack to a tie rod of a steering mechanism. The pinion shaft is supported at one end by a bearing that permits pivotal movement of the pinion shaft thereabout, and at its other end the pinion shaft is supported by a pair of bearings in a tube for axial, slidable movement. A spring acts on the tube between the pair of bearings to urge the pinion into pressure contact with the rack.

INVENTOR
Takeomi Miyoshi

RACK AND PINION STEERING GEAR APPARATUS FOR A VEHICLE

BRIEF SUMMARY OF THE INVENTION

This invention relates to a rack and pinion-type steering gear apparatus for a motorcar, or the like, which is so constructed that there will never be produced any gap in the gear mechanism portion thereof so as to prevent the generation of noise.

A conventional steering gear apparatus of the type in which a pinion connected to a steering wheel is in mesh with a rack connected to a tie rod of a steering mechanism is usually subjected to substantial wear in the engagement region of the pinion and the rack so that a gap gradually is produced which is eventually enlarged. A gap may also be the result of the accumulation of a deformation of each part and errors in assembly and such gaps cause generation of loud clattering noises, for example, from impact forces produced during vehicle travel.

An object of this invention is to provide a steering gear apparatus for a motorcar or the like, in which the rack and a pinion are so supported as to be always tightly on mesh with one with another such that there will never arise any gap therebetween and accordingly there will never be produced any clattering noises even when large impact loads are applied.

According to the invention, the pinion shaft is supported, at the end where it is in engagement with the rack, by a pair of bearings in a supporting tube such that the pinion shaft is axially slidable in the tube, and at its opposite end the pinion shaft is mounted in a bearing which permits pivotal movement of the pinion shaft thereat. The pinion shaft is continually urged into pressure contact with the rack by means of a spring acting on the supporting tube at a location between the pair of bearings.

DETAILED DESCRIPTION

Figure 1:
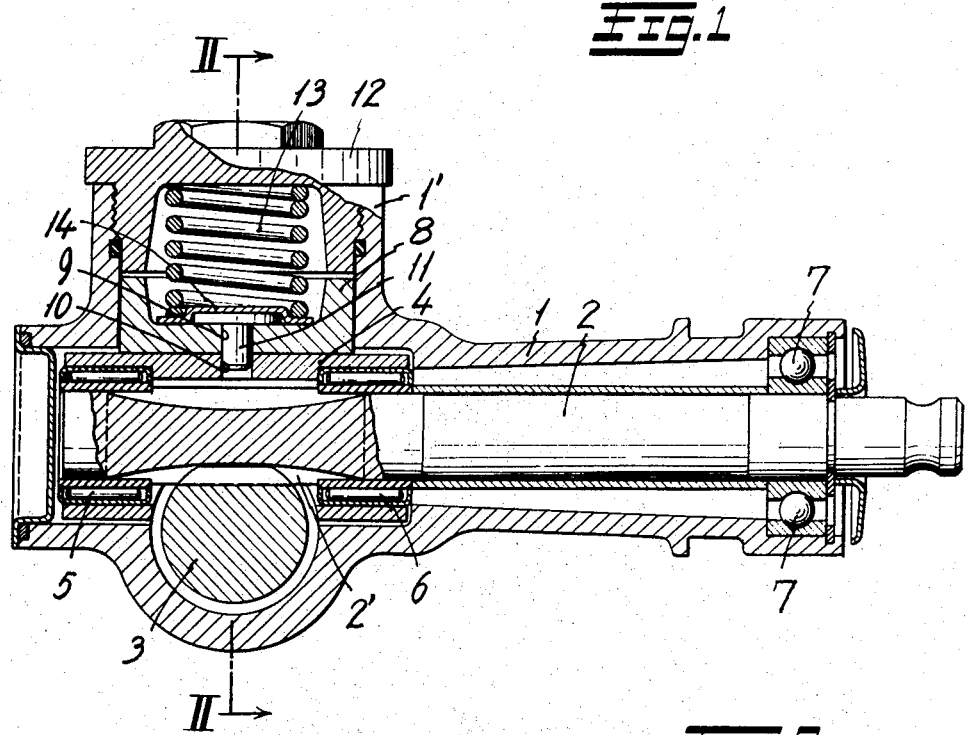
FIG. 1 is a longitudinal sectional side view of one embodiment of steering gear apparatus according to this invention.
Figure 2:
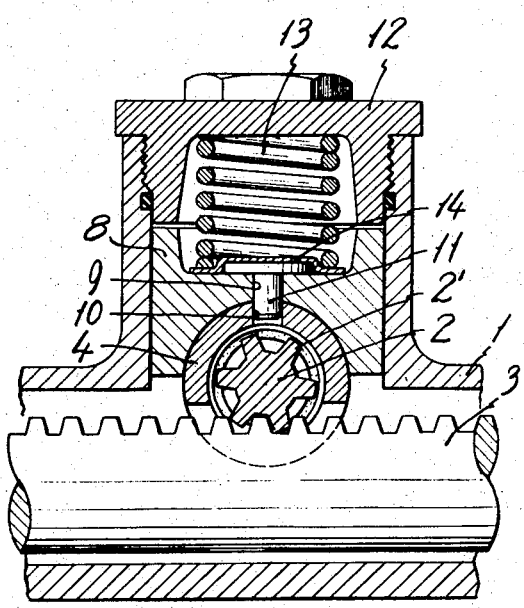
FIG. 2 is a sectional view taken along the line II—II IN FIG. 1.

A pinion shaft 2 connected to a steering wheel (not shown) is rotatably supported within a gearcasing 1, and a rack 3 connected to a tie rod of a steering mechanism (not shown) is also supported within the casing 1 so as to extend at right angles to the pinion shaft 2. The rack 3 is in mesh with a gear portion 2' on the pinion shaft 2.

The inner end of the pinion shaft 2 is axially slidably supported by a pair of needle bearings 5 and 6 in a supporting tube 4 provided within the gearcasing 1, and the outer end of the pinion shaft 2 is supported by a ball bearing 7 at the end of the gearcasing 1.

A guide member 8 is slidably mounted in a boss portion 1' projecting integrally from the gearcasing 1, and the guide member 8 and the supporting tube 4 are provided with mutually communicating openings 9 and 10. A pin 11, supported in the guide member 8, is loosely mounted in the openings 9 and 10. An open end of the boss portion 1' of the gear casing 1, is provided with a covering closure 12 in threaded engagement therewith, and a compression spring 13 is interposed in compressed state between the covering closure 12 and the guide member 8, so that the spring 13 urges the guide member 8 against the supporting tube 4 through the intermediary of a spring seat 14 which serves also to hold the pin 11 in openings 9 and 10. The axis of the spring 13 is located between the needle bearings 5 and 6 and in alignment with the axis of the rack 3 and perpendicular thereto.

The operation of the apparatus is as follows:

If the steering wheel is rotated, the pinion shaft 2 connected thereto is rotated and the rack 3 is displaced, whereby the tie rod connected to the rack 3 is operated for effecting the steering operation.

As the pinion shaft 2 is longitudinally slidably supported through the needle bearings 5 and 6 by the supporting tube 4, the pinion shaft 2 is pivotable about the ball bearing 7 serving as a pivot point and the resilient force of the spring 13 urges the gear portion 2' of the pinion shaft 2 into pressure contact with the rack 3. Accordingly, the pinion shaft 2 pivots to follow the rack 3 whenever any displacement of the rack 3 occurs, so that the gear portion 2' and and rack 3 are always kept tightly in mesh with one another. Any load applied to the rack 3 due to an impact during vehicle travel, or the like, is transmitted to the gear casing 1 through the pinion shaft 2, the supporting tube 4 and the guide member 8, so that the ball bearing 7 is kept free of load.

The supporting tube 4 is restrained by the guide member 8 from moving in the longitudinal direction of the rack 3 and is also restrained by the pin 11 from moving in the longitudinal direction of the pinion shaft 2 and from rotating about the pinion shaft 2.

In the apparatus of the invention, as described above, the pinion shaft 2 is movable in the longitudinal direction thereof in relation to the supporting tube and also is pivotable about the bearing 7 serving as a pivot point, so that the gear portion 2 can always smoothly follow the displacement of the rack 3 and thereby prevent the formation of a gap between the gear portion 2' and the rack 3. Even when the gap is caused by wear, deformation or manufacturing error, the gap is always eliminated.

Since additionally the pinion shaft 2 is supported by the supporting tube 4, the resilient force of the compression spring is not exerted directly on the pinion shaft, thereby preventing application of an undue force on the pinion shaft. A load from the rack is transmitted to the gear casing through the pinion shaft, the supporting tube and the guide member, so as to prevent application of an undue load to the ball bearing 7 serving as the pivot point.

What is claimed is:

1. Steering gear apparatus for a vehicle comprising a pinion shaft connected to a steering wheel, a rack meshed with the pinion shaft and connected to a tie rod of a steering mechanism, a supporting tube supporting said pinion shaft at one end thereof for axial sliding movement therein, means supporting the pinion shaft at the other end thereof so as to constitute a pivot point for the pinion shaft, and means acting on said supporting tube to urge the pinion shaft into pressure contact with the rack, said means acting on the supporting tube to urge the pinion shaft into contact with the rack comprising spring means applying force to said shaft in a direction normal to said shaft to urge the shaft into pressure contact with the rack, and further comprising a guide member engaging said supporting tube and in contact with and directly receiving thrust from said spring means.

2. Steering gear apparatus as claimed in claim 1, wherein said spring means comprises a coil spring having one end engaged with said guide member, and means engaging the opposite end of the spring to compress the same and apply the shaft into pressure contact with the rack.

3. Steering gear apparatus as claimed in claim 2, wherein said means engaging the opposite end of the spring is adjustable to regulate the compression of the spring.

4. Steering gear apparatus as claimed in claim 2 comprising pin means coupling the guide member and the supporting tube for common rotation and axial movement.

5. Steering gear apparatus as claimed in claim 4 comprising a gearcasing enclosing said shaft, rack, and supporting tube, said gearcasing including a boss portion slidably receiving said guide member, said means which engages the opposite end of the spring comprising a cover secured to said boss portion of said casing, said spring being confined between said guide member and said cover.

6. Steering gear apparatus as claimed in claim 1, wherein said guide member is located in alignment with the rack and between said pair of bearings.